INVENTOR.
EDWARD H. DINGER
BY Isidore Match
HIS ATTORNEY

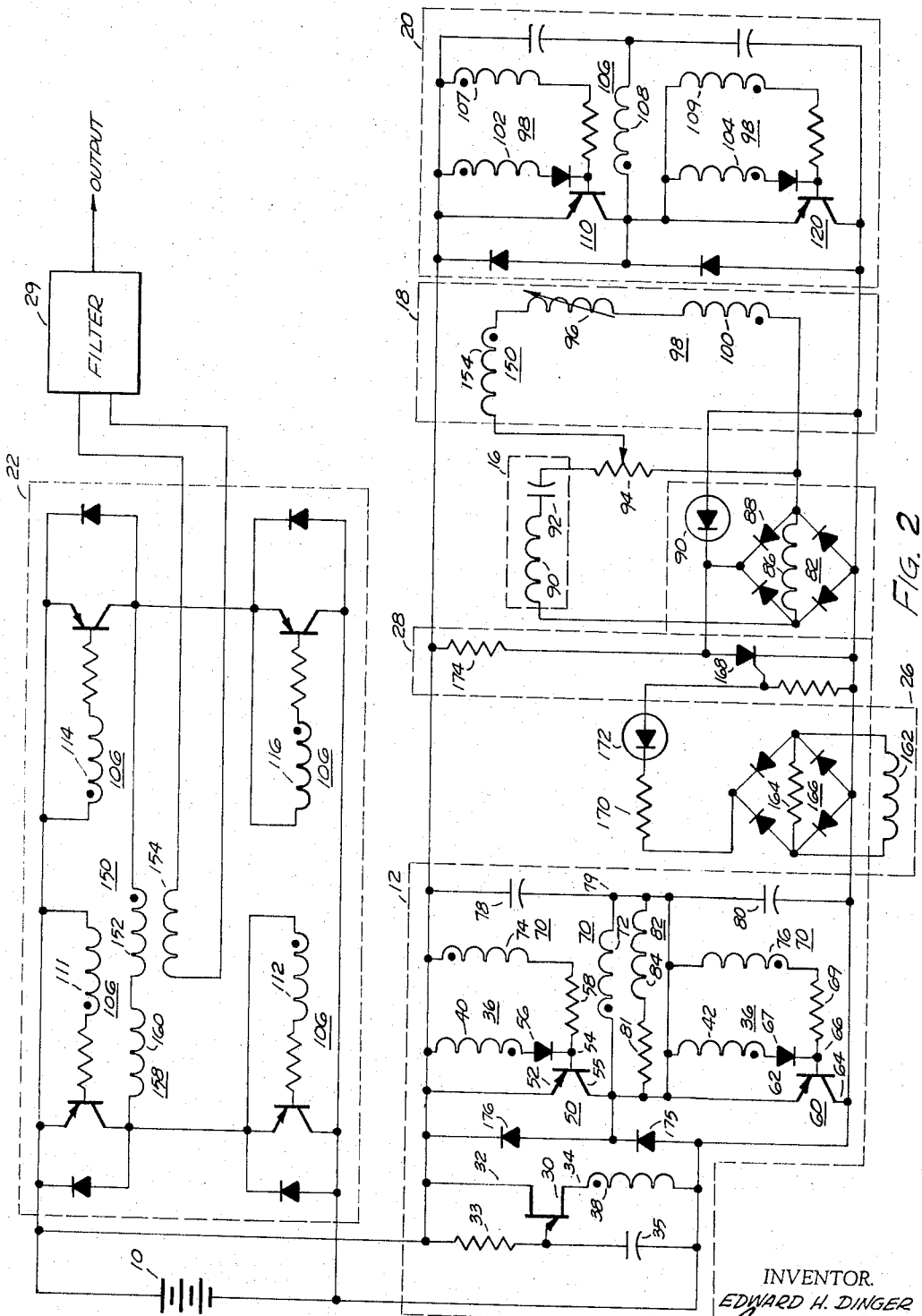

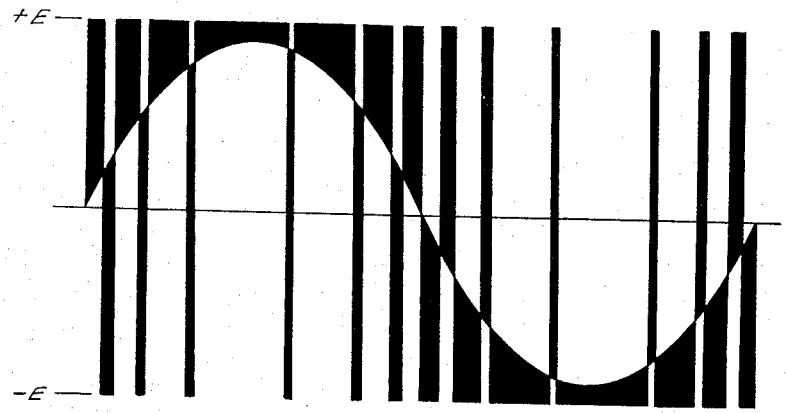
FIG. 3A
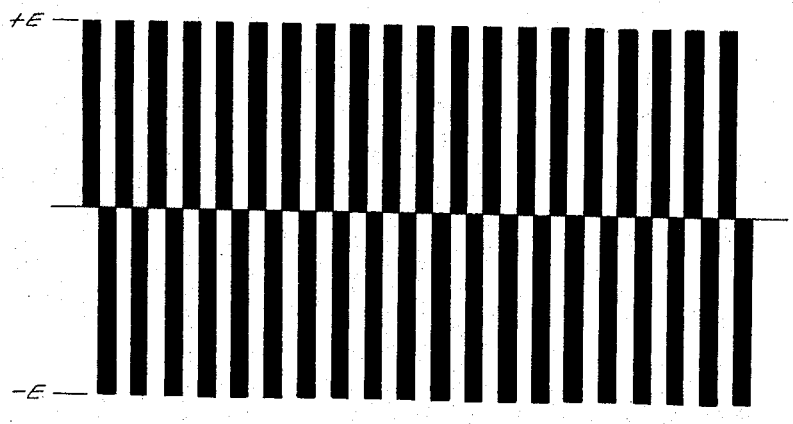
TIME  FIG. 3B

United States Patent Office 3,360,711
Patented Dec. 26, 1967

3,360,711
CONTROL ARRANGEMENT FOR AN INVERTER CIRCUIT
Edward H. Dinger, Waynesboro, Va., assignor to General Electric Company, a corporation of New York
Filed Dec. 19, 1963, Ser. No. 331,752
10 Claims. (Cl. 321—18)

This invention relates to inverters. More particularly it relates to improved inverters which can provide a substantially pure sinusoidal output into a wide range of types of loads with good transient response.

It is an object of this invention to provide an inverter which is simple and comparatively inexpensive and which provides an amplitude regulated, substantially pure sinusoidal wave output for a wide range of types of loads and which has good transient response.

It is another object to provide an inverter in accordance with the preceding object which is self-protecting against component damage in the event of overloads including short circuits in the load circuit.

Generally speaking and in accordance with the invention, there is provided in combination a signal level inverter and a power level output bridge. The power level bridge comprises an arrangement of unidirectional switching components adapted to conduct current from a source of unipolarity electric power through alternately conductive paths to a set of bipolarity output terminals. The signal level inverter is supplied by a small portion of the same power, and it comprises means for generating a signal level rectangular wave and means connected in circuit therewith for producing an amplitude regulated alternating reference signal of a desired frequency (e.g., 60 cycles per second) and a chosen wave shape (e.g., a substantially pure sinusoidal configuration). This reference signal serves as a model for the bipolarity output of the power level bridge. Toward this end, means are provided for instantaneously comparing the reference signal with an alternating current feedback signal derived from the output terminals of the power level bridge to produce an alternating error signal that is representative of the difference therebetween. In accordance with my invention, the error signal is integrated, and as soon as its time integral reaches a predetermined absolute magnitude a control signal is produced that is applied as a drive input to certain switching components in the power level output bridge. When a relatively positive error signal has been integrated, the resulting control signal is arranged to cause the bridge to switch its output polarity from positive to negative, whereupon the error signal becomes negative and, when subsequently produced, the succeeding control signal will be appropriate to cause the bridge to switch its output polarity from negative to positive. Preferably the relevant parameters are selected so that many (i.e., approximately five or more) control signals are produced during each half cycle of the reference signal. By connecting filter means to the output terminals of the bridge, an alternating current power output having the same frequency and wave shape as the reference signal is readily obtainable. Since the fundamental frequency of the unfiltered alternating voltage of the bridge is equal to the desired frequency, with a higher-frequency ripple superimposed thereon, the filter requirements for this power output can be met with only small filtering components and thus the transient response of the circuit is good. To provide protection against component damage in the event of overloads including short circuits in the load circuit, means are included for sensing the output current and means are further included which, in response to a load which would otherwise result in an output current that would exceed a given safe value, act to reduce the amplitude of the reference signal and thus the amplitude of the output voltage of the power bridge by an amount sufficient to keep the actual output current from exceeding the given safe value.

The novel features of this invention which are believed to be new are set forth with particularity in the appended claims. The invention itself, however, may best be understood by reference to the following description when taken in conjunction with the accompanying drawings which show an illustrative embodiment of an inverter in accordance with the invention.

In the drawings,

FIG. 2 is essentially a schematic diagram of an example of an inverter as depicted in block form in FIG. 1; and FIGS. 3A and 3B show voltage wave shapes for the power level output inverter under different load conditions, respectively.

Figure 1:
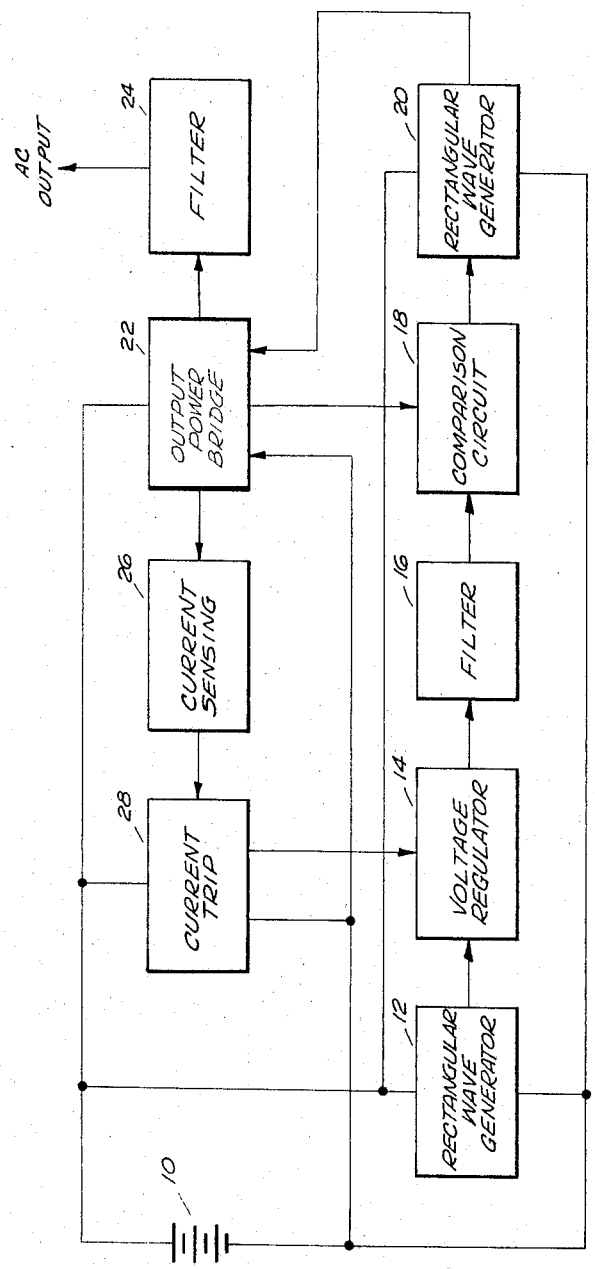
FIG. 1 is a block diagram of an inverter constructed in accordance with the principles of the invention.

Referring now to FIG. 1 wherein there is shown a block diagram of an inverter constructed in accordance with the principles of the invention, a portion of the unidirectional potential supply 10, shown as a battery, and which it is desired to invert to an alternating current power output is applied to a rectangular wave generator 12 which produces a rectangular wave output having the desired output frequency. Generator 12 may suitably comprise a unijunction transistor oscillator having an output frequency which is twice the desired frequency, the output of the unijunction transistor oscillator being applied to a transistor bistable circuit whose output is a rectangular wave having the desired frequency. Alternatively, generator 12 may be a circuit such as a magnetic coupled multivibrator having the desired output frequency.

The output of generator 12 is applied to a stage 14 legended voltage regulator, stage 14 operating to limit the output of generator 12 to a chosen maximum level. Voltage regulator 14 may suitably be a bridge rectifier whose output is clamped to a chosen level by a breakdown diode. The output of voltage regulator 14 is applied to a low pass filter 16, filter 16 suitably being a series resonant circuit tuned to the desired output frequency, the output of filter 16 being a comparatively pure sinusoidal wave which is clamped to the aforesaid maximum level. The output of filter 16 is a "model" voltage in the circuit, i.e., it serves as a reference standard with respect to wave shape and amplitude as will be further explained hereinbelow.

A portion of the output of filter 16 is compared with a portion of the output from a stage 22, legended output power bridge, in a comparison circuit 18 to derive a difference voltage therebetween. Comparison circuit 18 may suitably include a saturable device such as a saturable reactor which functions as a volt-second gate. Depending upon whether the instantaneous value of the portion of the voltage taken from the output of filter 16 is greater or less than the instantaneous value of the portion of the output taken from power bridge 22, the saturable device comprising comparison circuit 18 proceeds toward saturation either in the positive or negative direction. Upon its saturation in either polarity, a voltage appears at the output of comparison circuit 18, this voltage being applied to a rectangular wave generator 20 which suitably may be a bistable transistor oscillator, a magnetic coupled multivibrator, or the like.

The output of generator 20 is applied to an output power bridge 22 which may suitably be a bridge transistor bistable circuit or other type static inverter using unidirectional switching components such as silicon controlled rectifiers. The output of power bridge 22 may be applied to a low pass filter 24 which produces the sinusoidal wave power output of the circuit, such output having the desired fundamental frequency. Output filter 24 may suitably include a series tuned LC filter in one output line and a shunt capacitor or other appropriate filter arrangement.

It is seen that by utilizing the model voltage output of filter 16 as a standard of comparison, the system of FIG. 1 functions to produce an output voltage whose fundamental frequency is proportional to the model voltage at all times. If the volt-second capacity of the saturable device in comparison circuit 18 is selected to be quite small, the average frequency of the operation of rectangular wave generator 20 may be chosen to be quite high as compared to the desired output frequency. Consequently, the output of power bridge 22 consists of a wave of fundamental frequency upon which a high frequency ripple, i.e., the frequency of the output of rectangular wave generator 20, is riding. Since the model voltage produced at the output of filter 16 is a standard both with respect to correct wave shape and desired amplitude, the output of power bridge 22 is maintained at a substantially constant RMS value and a desired wave shape therefor is maintained despite changes either in the value of the unidirectional potential supply 10 or in the circuit load. Furthermore, because the output of power bridge 22 consists of a wave of fundamental frequency upon which a high frequency ripple is riding, the amount of filtering required in filter stage 24 to produce the desired sinusoidal wave output can be made to be quite small. The enabling of the use of such small filtering components results in a good transient response for the system.

To provide protection against overload currents in the system of FIG. 1, the current in output power bridge 22 is sensed in a current sensing stage 26, current sensing stage 26 suitably comprising a current transformer in series arrangement with the primary winding of an output transformer in power bridge 22. This current is supplied to a resistor connected across the current transformer winding to provide a voltage proportional to output load current. The latter voltage may suitably be rectified in a bridge rectifier, the rectified voltage being applied to a current trip stage 28.

Current trip stage 28 may suitably include a silicon controlled rectifier connected in its anode to cathode path across the voltage regulator 14. The unidirectional potential output of the bridge rectifier is applied to the gate electrode of the silicon controlled rectifier through a breakdown diode. The breakdown diode is chosen to have a breakdown voltage value which represents a current overload. Thus, in the operation of the current trip stage 28, if the breakdown diode conducts in its cathode to anode path, the silicon controlled rectifier is gated into conductivity and the output of voltage regulator 14 is shorted thereby reducing the model voltage to zero. In this situation, although output power bridge 22 may still continue to function, its output will be of a high frequency since the output of comparison circuit 18 and consequently the output of rectangular wave generator 20 will be of high frequency. However, very little current will flow in the power bridge output because of the high frequency at which power bridge 22 would be operating in this situation and because the impedance of output filter 24 to this high frequency is high.

It is thus seen that with the circuit of FIG. 1, there is provided an inverter which is simple and inexpensive, which provides a sine wave output into a wide range of types of load, has good transient response and which is self-protecting against component damage in the event of overloads including short circuits in the load circuit. To provide these advantages the system of FIG. 1 enables wave shaping, voltage regulation through the use of the model voltage produced at the output of filter 16, and the enabling of the small size of output filtering components by the use of a high frequency comparison circuit whereby the output of the power bridge is a wave of fundamental frequency having a high frequency ripple riding thereon. Protection against component damage in the event of overloads and short circuits in the load circuit is provided by the combination of the current sensing, current trip, and voltage regulator stages in the system.

In FIG. 2 there is shown a schematic diagram of an example of a circuit suitable for use as the circuit depicted in block form in FIG. 1. In FIG. 2, the dashed blocks correspond to those having the same numerical designation in FIG. 1. Thus, the rectangular wave generator 12 may suitably comprise a unijunction transistor pulse oscillator, the output of which is applied to a bistable transistor circuit. The pulse oscillator comprises a unijunction transistor 30 having a base 32 connected to the positive terminal of source 10 and a base 34 connected to the negative terminal of source 10 through the primary winding 38 of an output transformer 36. The emitter 31 of unijunction transistor 30 is connected to the positive terminal of source 10 through a resistor 33 and to the negative terminal of source 10 through a capacitor 35, resistor 33 and capacitor 35 providing the RC time constant circuit for the pulse oscillator which determines its pulse repetition frequency. The values of resistor 33 and capacitor 35 are so chosen whereby the frequency of the output of the pulse oscillator is equal to twice the desired output frequency of the circuit.

The bistable transistor circuit comprises transistors 50 and 60 and their associated circuit elements. The emitter 52 of transistor 50 is directly connected to the positive terminal of source 10 and the base 54 is connected to the positive terminal of source 10 through the cathode to anode path of a diode 56 and a secondary winding 40 of transformer 36. Base 54 is also connected to the positive terminal of source 10 through the series arrangement of a current limiting resistor 58 and a secondary winding 74 of the drive transformer 70 of the bistable circuit. Similarly, the emitter 62 of transistor 60 is connected to the collector 55 of transistor 50, the colletcor 64 is connected to the negative terminal of source 10 and the base 66 is connected to collector 55 through the series arrangement of the cathode to anode path of a diode 67 and a secondary winding 42 of transformer 36 and through the series arrangement of a resistor 69 and a secondary winding 76 of transformer 70. The series arrangement of capacitors 78 and 80 is connected across the series arrangement of transitors 50 and 60, the junction 79 of capacitors 78 and 80 being connected to the collector 55 of transistor 50 through the primary winding 72 of the bistable circuit drive transformer 70.

Considering the operation of the bistable circuit in rectangular wave generator 12, it may be assumed that when the source voltage 10 is initially applied, small leakage currents will flow in one or the other of the transistors or both and that these currents will not be equal and that therefore there will be a net current flowing either into or out of primary winding 72 of transformer 70. Since secondary windings 74 and 76 of transformer 70 are connected in a regenerative sense into the base circuits of transistors 50 and 60 respectively, this small initial current in the primary winding 72 will cause either transistor 50 or transistor 60 to be switched into full conduction. In the event of insufficient transistor leakage currents, a resistor of high ohmic value may be connected between base 66 of transistor 60 and the negative terminal of source 10 in order to initiate operation.

Now, considering the method of triggering the bistable circuit from pulses generated in the pulse oscillator, it is seen that secondary windings 40 and 42 of pulse transformer 36 are so poled whereby when the voltages at the dot terminals thereof are positive, the bases of both transistors 50 and 60 are back biased with respect to their respective emitters with the result that both transistors will become non-conducting. Because of the inductive nature of the primary winding 72 of transformer 70, the current flowing in this winding just prior to the arrival of the turn off pulses at the bases of the transistors will be maintained by the energy stored in this inductance through whatever path is available. For example, in the event that current had been flowing from the positive terminal of source 10 through the emitter to collector path of transistor 50 into the dot end of winding 72, the current will, after transistor 50 is made non-conducting, find a new path from the negative terminal of source 10 through diode 175 into the dot end of winding 72. It is seen that the induced voltage change that accompanies this change in current path causes the polarity of the voltage across winding 72 to reverse and thereby causes the polarities of secondary windings 74 and 76 of transformer 70 to reverse. After the voltage pulses at windings 40 and 42 of transformer 36 disappear, the bistable circuit locks into its new state and remains so until pulses arrive again at windings 40 and 42 at which time the bistable circuit reverts to its opposite state through a train of corresponding events. Thus, the bistable transistor circuit produces one cycle of rectangular wave output for every two pulses produced by the pulse oscillator, the frequency of the output of the bistable transistor circuit being the desired output frequency for the circuit of FIGS. 1 and 2. The output of the bistable circuit is suitably produced on the primary winding 84 of a transformer 82 which is connected in series with a resistor 81 between junction 79 and collector 55.

The output of rectangular wave generator 12 is applied to voltage regulator 14. Voltage regulator 14 comprises a bridge rectifier 88, there being connected across the AC terminals of bridge rectifier 88 a secondary winding 86 of transformer 82. Connected between the positive and negative DC terminals of bridge rectifier 88 is the cathode to anode path of a breakdown diode 90 which clamps the output of stage 12 to a selected value. The clamped rectangular wave AC voltage output from rectifier 88 is applied to filter 16 which is a series tuned LC resonant circuit that is tuned to the desired output frequency and comprises an inductor 90 and a capacitor 92, a variable resistor 94 being provided between filter 16 and one of the AC terminals of bridge rectifier 88. Accordingly, there appears across resistor 94 a voltage regulated, substantially pure sinusoidal wave having the desired output frequency, this voltage serving as a model voltage against which the output of power bridge 22 is referenced both as to frequency, amplitude and wave shape. A portion of this model voltage is applied to comparison circuit 18, which portion is sometimes referred to herein as the reference signal.

Comparison circuit 18 comprises a secondary winding 154 of the output transformer 150 of power bridge 22, integrating means 96 and the primary winding 100 of a transformer 98. The integrating means 96 preferably comprises a volt-second gate, i.e., a saturable reactor. It is seen that the difference between the portion of the voltage taken from resistor 94 and the portion of the output voltage appearing in winding 154 (sometimes referred to herein as the feedback signal) provides exciting voltage for saturable reactor 96 in series with transformer winding 100, saturable reactor 96 being driven to positive or negative saturation depending upon the polarity of the aforesaid voltage difference. The purpose of the reactor 96 is to hold off operation of the transformer 98 until the time integral of the difference voltage (sometimes referred to herein as the error signal) reaches a predetermined absolute magnitude.

Consequently, when saturation in one direction is attained in reactor 96, a voltage pulse of one polarity appears on primary winding 100 of transformer 98. Similarly, when saturation in the opposite direction is attained in reactor 96, a voltage of the other polarity appears on primary winding 100 of transformer 98. These pulses are applied as triggering pulses to transistors 110 and 120 of rectangular wave generator 20 through secondary windings 102 and 104 of transformer 98. It is to be noted that rectangular wave generator 20 is similar in structure to the bistable transistor circuit of rectangular wave generator 12, the output of generator 20 appearing on the primary winding 108 of a transformer 106, the secondary windings 107 and 109 of transformer 106 providing regenerative drive to transistors 110 and 120 respectively. However, in contrast to the bistable transistor circuit 12 which operates at a constant frequency, that frequency being the same as the desired fundamental frequency, bistable circuit 20 operates at a variable, and generally higher, frequency, this frequency being determined by the rate of pulse generation in comparison circuit 18.

The output of the bistable circuit 20 is a train of alternately positive and negative control signals impressed across primary winding 108 of transformer 106 whose secondary windings 111, 112, 114, and 116 appear in the base to emitter drive circuits of the four switching components (shown as power transistors) comprising the respective arms of the illustrated bridge 22. The secondary windings 111 and 114 of transformer 106 are so poled that the transistors respectively associated therewith are alternately conductive, and the secondary windings 112 and 116 are so poled that diagonally disposed transistors are concurrently conductive. The direct current input terminals of the bridge 22 are shown connected to opposite poles of the battery 10, and the primary winding 152 of the output transformer 150 is connected between the alternating current output terminals of the bridge. With this arrangement a first current-conducting path, including the upper left and lower right arms of the bridge (when the transistors in these arms are switched to conducting states by the action of the windings 111, 116), will conduct current from the battery 10 in one direction through the transformer winding 152, while a complementary current-conducting path, including the upper right and lower left arms of the bridge (when the transistors in these arms are switched to conducting states by the action of the windings 114 and 112), will conduct current from the same battery in the opposite direction through the transformer winding 152. Thus there appears on output transformer 150 a rectangular wave whose magnitude is equal to that of the battery voltage and whose polarity reverses each time a control signal is initiated by a triggering pulse applied to the control signal generator 20. The resulting output of the secondary winding 154 of the transformer 150 is an unfiltered relatively high frequency alternating voltage having a fundamental frequency that is equal to the frequency of the model voltage. The filter 24 is connected to the secondary winding 154, and its output will be a substantially pure sinusoidal wave having the desired output frequency.

As has been explained hereinabove, if saturable reactor 96 is chosen to have a small saturation period, the variable frequency of rectangular generator 20 may be quite high on the average whereby the output of power bridge 22 is a wave having the fundamental frequency with a superimposed ripple thereon having the variable frequency of a rectangular wave generator 20, the comparison circuit wherein the output is compared with a model voltage appearing across resistor 94 providing the standard of reference for the output appearing in transformer 150 with regard to frequency, wave shape and amplitude. With this arrangement, the components of low pass filter 24, as stated hereinabove, may be small to provide good transient response for the circuit when load is applied or removed at the output terminals. It is noted that the transistors in the circuit of FIG. 2 all have connected across their emitter to collector paths respectively, the cathode to anode paths of diodes to enable the circuit to handle reactive loads. It is to be realized that stage 22 can suitably comprise another type inverter, for example, one having silicon controlled rectifiers as the switching elements therein. In the latter situation, the inverter could be supplied from an independent source separate from the supply for the control elements of the arrangement. Such arrangement is possible since drive transformer 106 and output transformer 150 can provide electrical isolation between output stage 22 and the remainder of the circuit.

In FIG. 3A, there is shown the voltage appearing at the output of output power bridge 22 under normal operating conditions and in FIG. 3B there is shown the voltage appearing at the power bridge output after the current trip circuit has been operated. It will be observed that the solid black sub-divisions shown in these figures have equal areas, each representing the aforesaid predetermined absolute magnitude of the time integral of the error signal.

The output current of bridge 22 is sensed in the primary winding 160 of a current transformer 158, the current appearing in secondary winding 162 of transformer 158 being caused to flow through a resistor 164 to provide a voltage proportional to the output current. This voltage is rectified in a bridge rectifier 166 and such rectified voltage is applied to the gate electrode of a silicon controlled rectifier 168 through the series arrangement of a resistor 170 and the cathode to anode path of a breakdown diode 172.

The series arrangement of a resistor 174 and the anode to cathode path of silicon controlled rectifier 168 are the components in the current trip circuit 28. The values of the components in the trip circuit are so chosen whereby when the output current exceeds a given safe value, the voltage developed across resistor 164 is sufficient to cause diode 172 to break down whereby silicon controlled rectifier 168 is rendered conductive thereby causing current to flow from the positive terminal of the unidirectional potential supply 10 through resistor 174 and silicon controlled rectifier 168.

When this occurs, the model voltage appearing across resistor 94 is reduced to substantially zero whereby the circuit will tend to maintain the output at zero value, i.e., the comparison circuit will cause bistable circuit 20 and thus output bridge 22, to operate at a fixed high frequency having none of the desired fundamental frequency. As has been stated hereinabove, not much current will flow because of the high frequency of operation at this time and because the impedance of the components in filter 24 to such high frequency is high.

It is seen from the foregoing that the inverter provided in accordance with the principles of this invention is simple in construction, is self-protecting against component damage in the event of overloads including short circuits in the load circuit and provides output regulation.

While there has been described what is considered to be the preferred embodiment of this invention, it will be obvious to those skilled in the art that various changes and modifications may be made therein without departing from the invention and it is, therefore, aimed in the appended claims to cover all such changes and modifications as fall within the spirit and scope of the invention.

What is claimed as new and desired to be secured by Letters Patent of the United States is:

1. An arrangement for converting the output of a unidirectional power source to a sinusoidal power output comprising: power conversion means adapted to be connected to said source and operative in response to the application thereto of a train of control signals for producing an unfiltered alternating voltage of rectangular wave shape the relative polarity of which alternates in response to immediately succeeding control signals; means for producing an amplitude regulated alternating current model voltage having a selected fundamental frequency and a sinusoidal wave shape; means for comparing a portion of said unfiltered alternating voltage with a portion of said model voltage to produce an alternating current error potential representative of the magnitude difference therebetween; means responsive to the time integral of said error potential for producing said train of control signals at a frequency at least five times greater than said fundamental frequency and for applying said train to said power conversion means; and filter means in circuit with said power conversion means for converting said alternating voltage to said sinusoidal power output.

2. An arrangement for converting the output of a unidirectional power source to an alternating current power output comprising means adapted to be connected in circuit with a portion of said source output for producing an amplitude regulated, alternating current voltage having a selected fundamental frequency and a chosen wave shape, means for comparing a portion of said alternating current output with a portion of said alternating current voltage to produce an alternating current potential having said fundamental frequency with a ripple thereon having a frequency greater than said fundamental frequency, power conversion means adapted to be connected to said source and responsive to the application thereto of said alternating current potential for producing said alternating current output, filter means in circuit with said power conversion means for producing said alternating current power output having said chosen wave shape, current sensing means in circuit with said power conversion means for sensing the current in said conversion means and for deriving a voltage proportional thereto, and current trip means adapted to be connected across said source and responsive to the application thereto of said derived voltage for short-circuiting said source through said current trip means.

3. An arrangement as defined in claim 2 wherein said means for producing said alternating current voltage comprises a pulse oscillator adapted to be connected across a portion of said source output and having an output frequency equal to twice said fundamental frequency, a bistable circuit responsive to the application thereto of the output of said pulse oscillator for producing a rectangular wave having said fundamental frequency, means in circuit with the output of said bistable circuit for clamping said rectangular wave to a chosen amplitude and filter means in circuit with said clamping means for producing said alternating current voltage having said selected fundamental frequency and said chosen wave shape.

4. An arrangement as defined in claim 3 wherein said pulse oscillator is a unijunction transistor oscillator.

5. An arrangement as defined in claim 4 wherein said clamping means comprises a full wave bridge rectifier having alternating current and direct current terminals and a breakdown diode connected across said direct current terminals.

6. An arrangement as defined in claim 2 wherein said comparing means comprises means in circuit with a portion of the output of said power conversion means and a portion of the output of said alternating current voltage producing means for subtracting said last named voltages from each other to produce a difference voltage therebetween, a saturable device responsive to the application thereto of said difference voltage for producing an output in accordance with the volt-second characteristic of said saturable device and means responsive to the application of the output of said saturable device for producing said alternating current potential having said fundamental frequency with said ripple thereon.

7. An arrangement as defined in claim 2 wherein said current sensing means comprises a current transformer having a primary winding in circuit with the output of said power conversion means and a secondary winding having a resistance connected thereacross for deriving a voltage proportional to the current in said current transformer, and a full wave rectifier responsive to the application thereto of said derived voltage for producing a unidirectional voltage proportional to the current in said current transformer.

8. An arrangement as defined in claim 7 wherein said current trip means comprises a gate controlled rectifier adapted to be connected across said source in its anode to cathode path, a diode which breaks down on the application thereto of a derived voltage exceeding a given level and means for applying said derived voltage to said gate electrode through said breakdown diode to short circuit said source through said gate controlled rectifier when said derived voltage exceeds said given level.

9. An improved control arrangement for an electric power converter comprising a set of input terminals adapted to be connected to a source of electric current, a set of alternating current output terminals, and means for electrically interconnecting said sets of input and output terminals, which means includes complementary first and second current-conducting paths with each of said paths including at least one unidirectional switching component, said first path being disposed to conduct source current in one direction with respect to said output terminals and said second path being disposed to conduct source current in the opposite direction with respect to said output terminals, the respective switching components of said first and second paths being alternately switched from nonconducting to conducting states in response to successive control signals supplied by a suitable control signal generator, wherein the improvement comprises the combination of:

(a) a source of an alternating reference signal having a desired frequency and a chosen wave shape;

(b) means connected to said set of output terminals for deriving a feedback signal that is representative of an alternating electric quantity at said output terminals, (c) means connected to said reference signal source and to said feedback signal deriving means for integrating the difference between said reference and feedback signals; and (d) means connected to said control signal generator and operative as soon as the time integral of said difference reaches a predetermined magnitude for initiating the next control signal, the parameters of this combination being so selected that a train of many control signals will be generated during each half-cycle of said reference signal.

10. The converter as defined in claim 9 wherein filter means is connected to said set of output terminals for providing filtered output power whose fundamental frequency is equal to said desired frequency and whose wave shape is essentially the same as said chosen wave shape.

References Cited

UNITED STATES PATENTS

| | | | |
|---|---|---|---|
| 3,214,672 | 10/1965 | Watkins | 321—16 |
| 2,959,725 | 11/1960 | Younkin | 321—18 |
| 3,074,008 | 1/1963 | McPhail. | |
| 3,124,740 | 3/1964 | Corey et al. | 321—47 X |
| 3,148,323 | 4/1964 | Blake et al. | 321—61 |
| 3,248,637 | 4/1966 | Albert et al. | 321—46 X |

JOHN F. COUCH, *Primary Examiner.*

W. SHOOP, *Assistant Examiner.*